US010756396B2

(12) United States Patent
Tang et al.

(10) Patent No.: US 10,756,396 B2
(45) Date of Patent: Aug. 25, 2020

(54) BATTERY CELLS FOR BATTERY PACKS IN ELECTRIC VEHICLES

(71) Applicant: SF Motors, Inc., Santa Clara, CA (US)

(72) Inventors: Yifan Tang, Santa Clara, CA (US); Chien-Fan Chen, Santa Clara, CA (US); Ying Liu, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 198 days.

(21) Appl. No.: 15/994,681

(22) Filed: May 31, 2018

(65) Prior Publication Data
US 2019/0296405 A1 Sep. 26, 2019

Related U.S. Application Data

(60) Provisional application No. 62/646,989, filed on Mar. 23, 2018.

(51) Int. Cl.
*H01M 10/48* (2006.01)
*H01M 2/02* (2006.01)
(Continued)

(52) U.S. Cl.
CPC .......... *H01M 10/48* (2013.01); *H01M 2/028* (2013.01); *H01M 2/0237* (2013.01);
(Continued)

(58) Field of Classification Search
CPC .... H01M 10/48; H01M 2/0237; H01M 2/043; H01M 2/028; H01M 10/0413;
(Continued)

(56) References Cited

U.S. PATENT DOCUMENTS

2014/0170446 A1* 6/2014 Elian ..................... G01M 3/227
429/61

FOREIGN PATENT DOCUMENTS

CN 101578721 11/2009
CN 201868536 6/2011
(Continued)

OTHER PUBLICATIONS

International Search Report and Written Opinion for PCT/CN/2018/102170 dated Nov. 6, 2018.

*Primary Examiner* — Gary D Harris
(74) *Attorney, Agent, or Firm* — Foley & Lardner LLP; James De Vellis

(57) ABSTRACT

Provided herein are battery cells for battery packs in electric vehicles. The battery cell can include a housing having a first end, a second end, and an inner surface. The housing can define an inner region and an electrolyte can be disposed in the inner region of the housing. A gasket can couple a lid with the first end of the housing to seal the battery cell. The inner surface can include a recess and a groove. The groove can form a path from the recess to an egress point on the first end of the housing. A pressure sensor can be disposed in the recess. The pressure sensor can couple with a pressure sensor wire disposed in the groove and the pressure sensor wire can extend from the recess and past the egress point on the first end of the housing to provide sensed pressure information.

20 Claims, 8 Drawing Sheets

(51) Int. Cl.
 *H01M 2/04* (2006.01)
 *H01M 10/04* (2006.01)
 *H01M 2/08* (2006.01)

(52) U.S. Cl.
 CPC ............. *H01M 2/043* (2013.01); *H01M 2/08* (2013.01); *H01M 10/0413* (2013.01); *H01M 2220/20* (2013.01)

(58) Field of Classification Search
 CPC .. H01M 2/08; H01M 2220/20; H01M 2/0434; H01M 2/024; H01M 2/1077
 USPC .......................................................... 429/90
 See application file for complete search history.

(56) References Cited

FOREIGN PATENT DOCUMENTS

| | | |
|---|---|---|
| CN | 102306851 | 1/2012 |
| CN | 105280973 | 1/2016 |
| CN | 107394079 | 11/2017 |
| CN | 107403972 | 11/2017 |

* cited by examiner

BATTERY CELLS FOR BATTERY PACKS IN ELECTRIC VEHICLES

CROSS REFERENCE TO RELATED APPLICATIONS

The present application claims the benefit of priority under 35 U.S.C. § 119(e) to U.S. Provisional Application 62/646,989, tilted "BATTERY CELL FOR ELECTRIC VEHICLE BATTERY PACK", filed on Mar. 23, 2018. The entire disclosure of which is incorporated herein by reference in its entirety.

BACKGROUND

Batteries can include electrochemical cells to supply electrical power to various electrical components connected thereto. Such batteries can be installed in a vehicle such as an automobile to provide electrical energy to various electrical systems installed within the vehicle.

SUMMARY

The present disclosure is directed to batteries cells for battery packs in electrical vehicles. The disclosed battery cell can include one or more pressure sensors embedded within an inner surface of the housings of the battery cell to provide pressure readings. The pressure sensor can couple with a pressure sensor wire embedded with in the inner surface of the housing to provide the sensed pressure information to a variety of different devices external to the battery cell. The pressure sensor and the pressure sensor wire can be disposed such that they do not destroy the seal of the battery cell.

At least one aspect is directed to a battery cell of a battery pack to power an electric vehicle. The battery cell can include a housing having a first end, a second end, and an inner surface. The housing can define an inner region with the inner region disposed between the first and second ends. An electrolyte can be disposed in the inner region of the housing. The battery cell can include a lid and a gasket that couples the lid with the first end of the housing to seal the battery cell. The inner surface can include a recess and a groove formed therein. The groove can form a path from the recess to an egress point on the first end of the housing.

At least one aspect is directed to a method of providing battery cells for battery packs of electric vehicles. The method can include providing a housing having a first end, a second end, and an inner surface. The housing can define an inner region with the inner region disposed between the first and second ends. An electrolyte can be disposed in the inner region of the housing. A lid can be disposed proximate to the first end of the housing. The method can include coupling the lid with the first end of the housing to seal the battery cell using a gasket. A recess and a groove can be formed on the inner surface. The groove forming a path from the recess to an egress point on the first end of the housing. The method can include disposing a pressure sensor in the recess formed in the inner surface. The pressure sensor can couple with a pressure sensor wire disposed in the groove. The pressure sensor wire can extend from the recess and past the egress point on the first end of the housing to provide sensed pressure information.

At least one aspect is directed to a method of supplying battery cells for battery packs of electric vehicles. The method can include providing a battery cell of a battery pack to power an electric vehicle. The battery cell can include a housing having a first end, a second end, and an inner surface. The housing can define an inner region, the inner region disposed between the first and second ends. An electrolyte can be disposed in the inner region of the housing.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

Figure 1:
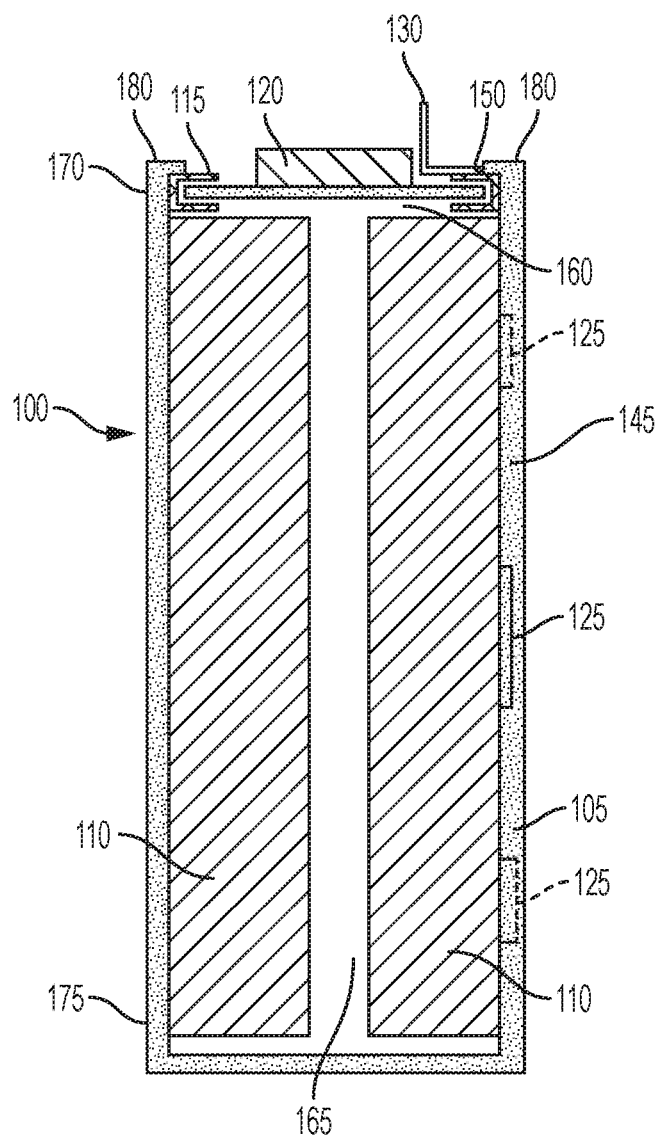
FIG. 1 is a block diagram depicting a cross-sectional view of an example battery cell for a battery pack in an electric vehicle.

Following below are more detailed descriptions of various concepts related to, and implementations of, methods, apparatuses, and systems of providing battery cells for battery packs of electric vehicles. The various concepts introduced above and discussed in greater detail below may be implemented in any of numerous ways, as the described concepts are not limited to any particular manner of implementation.

DETAILED DESCRIPTION

Following below are more detailed descriptions of various concepts related to, and implementations of battery cells for battery packs in electric vehicles. The various concepts introduced above and discussed in greater detail below can be implemented in any of numerous ways.

Described herein are battery cells for battery packs in electric vehicles ("EV's") for an automotive configuration. An automotive configuration can include a configuration, arrangement or network of electrical, electronic, mechanical or electromechanical devices within a vehicle of any type. An automotive configuration can include battery cells for battery packs in EV's. EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. Battery packs, which can also be referred to herein as battery modules, that include a plurality of individual battery cells can include a wire bond to form respective electrical connections between the individual positive and negative terminals of the battery cells of the battery pack and positive or negative busbars or current collectors.

One architecture of a cylindrical lithium ion (or other type of) battery cell can be include a deep-drawn metal cylinder casing and a protective cap at the top end. The protective cap can include devices to prevent against fires and explosions. Electrical current can flow from an anode housed within the casing to an anode tab and then through the casing itself via a bonded wire connection. In this manner, the casing of the battery cell can function as the negative terminal. The positive terminal of the battery cell can be on a lateral (e.g., top) end of the structure, and can include a lid. The lid can include a current interrupt device (CID), a rupture disk, and a gasket. The lid can reside within the gasket. The sealing element can insulate the positive terminal from the negative terminal of the battery cell.

The present disclosure is directed to battery cells having one or more pressure sensors embedded within an inner surface of the housings of the battery cell to provide pressure readings. The pressure sensor can couple with a pressure sensor wire embedded with in the inner surface of the housing to provide the sensed pressure information to a variety of different devices external to the battery cell. The pressure sensor and the pressure sensor wire can be disposed such that the seal of the battery cell is maintained. For example, pressure information from inside the battery cell can be provided without deforming, damaging or otherwise breaking a seal between the lid, gasket and housing of the battery cell.

For example, to measure pressure within the battery cells, a hole can be drilled or otherwise created through the lid or housing of the battery cell to provide a pathway for a wire to couple the pressure sensor with an external sensor and obtain readings from the pressure sensor. The lid can include a current interrupter device, such as notches or score marks that can rupture or open in the event of an out of tolerance range high pressure condition. When the hole is formed through the lid (which can also be referred to herein as a cap), the hole can impact the functionality of a current interrupter device (CID) or vent of the battery cell such that the CID or vent do not function properly. For example the hole with pressure sensor wire disposed therein may fail at a pressure level that is below the threshold tolerance pressure level of the CID. In this example the battery cell may fail or rupture during in-tolerance pressure conditions where the battery cell should function normally. The hole formed through the housing of the battery cell can increase the risk of electrically shorting the battery cell. Further, the hole may increase the risk of leakage from the battery cell and, for example, the electrolyte may evaporate during the process of forming the hole until the hole is resealed.

The battery cell as described herein can alleviate the problems associated with the pressure sensor by embedding the pressure sensor and wire(s) of the pressure sensor within an interior surface of the housing or can of the battery cells. This technique can provide a better contact point to couple the pressure sensor wire with the pressure sensor without damaging or otherwise reducing the functionality of different components of the battery cell. For example, the pressure sensor can be disposed within the battery cell without forming a hole in one or more portions of the battery cell (such as the can or housing). Thus, the seal of the battery cell can be maintained and the components, such as the CID or vent, do not lose functionality.

FIG. 1, among others, depicts a cross-sectional view of a battery cell 100 for a battery pack in an electric vehicle. The battery cell 100 can be a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. The battery cell 100 can include at least one housing 105. The housing 105 can be included in or part of a battery pack (e.g., a battery array or battery module) installed a chassis of an electric vehicle. The housing 105 can have the shape of a cylindrical casing or cylindrical cell with a circular, ovular, or elliptical base, as depicted in the example of the battery cell of FIG. 1. A height of the housing 105 can be greater than a diameter of the housing 105. For example, the housing 105 can have a length (or height) of 65 mm to 7 mm, inclusive and a maximum width (or diameter for circular examples) of 17 mm to 2 mm, inclusive. In some examples the width or diameter of the housing 105 can be greater than the length (e.g., height) of the housing 105. The housing 105 can be formed from a prismatic casing with a polygonal base, such as a triangle, square, a rectangular, a pentagon, or a hexagon, for example. A height of such a prismatic cell housing 105 can be less than a length or a width of the base of the housing 105.

The housing 105 of the battery cell 100 can include at least one electrically or thermally conductive material, or combinations thereof. The electrically conductive material can also be a thermally conductive material. The electrically conductive material for the housing 105 of the battery cell 100 can include a metallic material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The electrically conductive material and thermally conductive material for the housing 105 of the battery cell 100 can include a conductive polymer. To evacuate heat from inside the battery cell 100, the housing 105 can be thermally coupled to a thermoelectric heat pump (e.g., a cooling plate) via an electrically insulating layer. The housing 105 can include an electrically insulating material. The electrically insulating material can be a thermally conductive material. The electrically insulating and thermally conductive material for the housing 105 of the battery cell 100 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. To evacuate heat from inside the battery cell 100, the housing 105 can be thermally coupled to a thermoelectric heat pump (e.g., a cooling plate). The housing 105 can be directly thermally coupled to the thermoelectric heat pump without an addition of an intermediary electrically insulating layer.

The housing 105 of the battery cell 100 can include a first end 170 (e.g., top portion) and a second end 175 (e.g., bottom portion). The housing 105 can define an inner region 165 between the first end 170 and the second end 175. For example, the inner region 165 can include an interior of the housing 105. The first end 170, inner region 165, and the second end 175 can be defined along one axis of the housing 105. For example, the inner region 165 can have a width (or diameter for circular examples) of about 2 mm to about 6 mm and a length (or height) of about 50 mm to about 70 mm.

The first end 170, inner region 165, and second end 175 can be defined along a vertical (or longitudinal) axis of cylindrical casing forming the housing 105. The first end 170 at one end of the housing 105 (e.g., a top portion as depicted in FIG. 1). The second end 175 can be at an opposite end of the housing 105 (e.g., a bottom portion as depicted in FIG. 1). The end of the second end 175 can encapsulate or cover the corresponding end of the housing 105.

At least one electrolyte 110 can be disposed in the inner region 165 of the housing 105. The electrolytes 135 can include a negative electronic charge region or terminus and a positive electronic charge region or terminus. At least one negative tab can couple the electrolytes 135 (e.g., negative region of electrolytes 135) with the surface of the housing 105 or the negative lid portion of the lid 120.

The electrolyte 110 can include any electrically conductive solution, dissociating into ions (e.g., cations and anions). For a lithium-ion battery cell, for example, the electrolyte 110 can include a liquid electrolyte, such as lithium bisoxalatoborate (LiBC4O8 or LiBOB salt), lithium perchlorate (LiClO4), lithium hexaflourophosphate (LiPF6), and lithium trifluoromethanesulfonate (LiCF3SO3). The electrolyte 110 can include a polymer electrolyte, such as polyethylene oxide (PEO), polyacrylonitrile (PAN), poly (methyl methacrylate) (PMMA) (also referred to as acrylic glass), or polyvinylidene fluoride (PVdF). The electrolyte 110 can include a solid-state electrolyte, such as lithium sulfide (Li2S), magnesium, sodium, and ceramic materials (e.g., beta-alumna).

Multiple electrolytes 110 (e.g., two electrolytes, more than two electrolytes) can be disposed within inner region 165 of the housing 105. For example, two electrolytes 110 can be disposed within inner region 165 of the housing 105. The number of electrolytes 110 can vary and can be selected based at least in part on a particular application of the battery cell 100.

Figure 5:
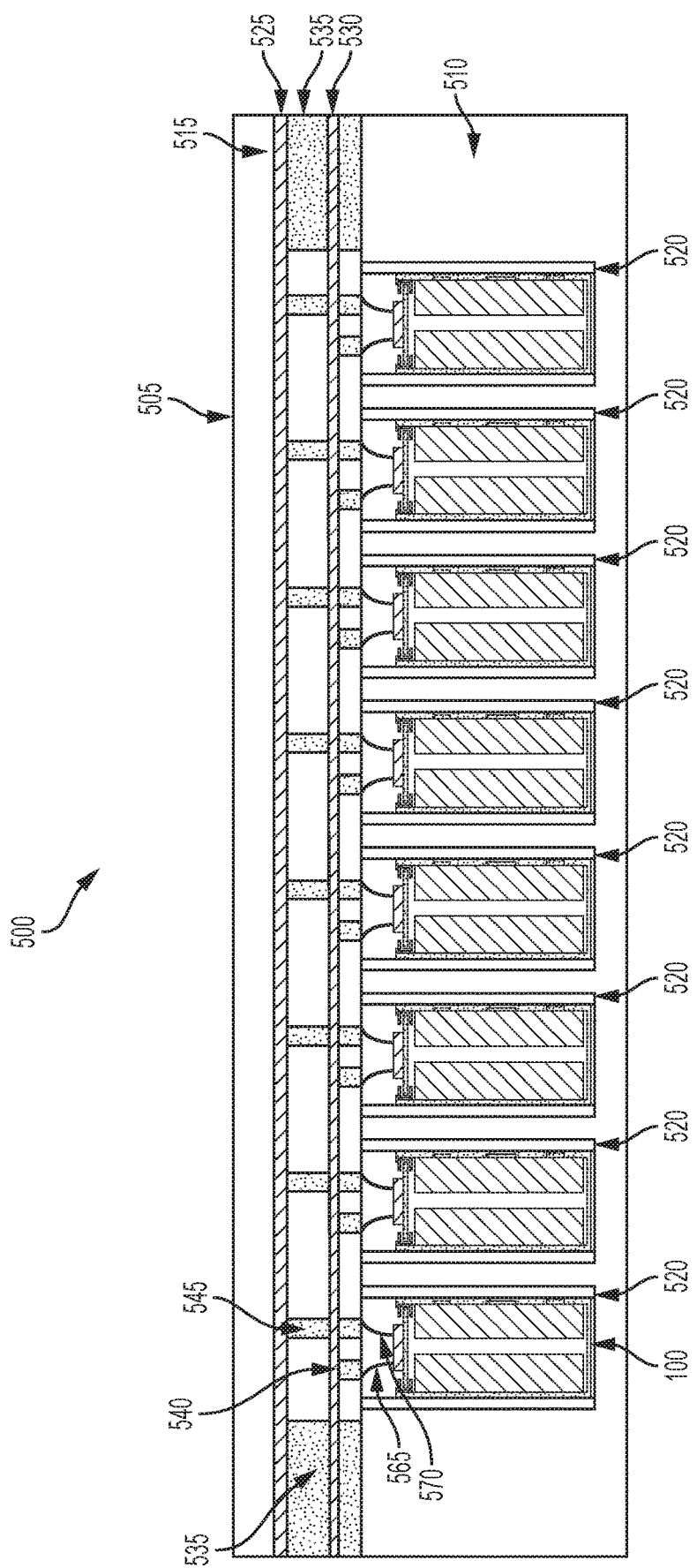
FIG. 5 is a block diagram depicting a cross-sectional view of an example battery pack for holding battery cells in an electric vehicle.

At least one lid 120 can be disposed proximate to the first end 170 of the housing 105. The lid 120 can include a current interrupter device (e.g., CID). The lid 120 can be disposed onto the first lateral end 170 of the housing 105. The lid 120 can include a negative portion and a positive portion. For example, the negative lid portion can operate as the negative terminal of the battery cell 100 and the positive lid portion can operate as the positive terminal of the battery. The battery cell 100 can couple with positive and negative current collectors of a battery module of an electric vehicle through the positive lid portion and the negative lid portion of the lid 120 (as shown in FIG. 5). For example, via a module tab connection (or other techniques such as wire bonding), the positive lid portion and the negative lid portion of the lid can couple the battery cell 100 with current collectors of the battery module from the lateral ends (e.g., top or bottom) or from longitudinal sides of the battery cell 100. One or more battery modules can form a battery pack disposed in an electric vehicle to power a drive train of the electric vehicle.

The lid 120 can couple with the electrolyte 110 through one or more tabs. For example, a negative tab can couple the electrolyte 110 with the negative lid portion of the lid 120. When the negative lid portion of the lid 120 is coupled with the electrolyte 110 through the negative tab, the housing 105 may include non-conductive material. A positive tab can couple the electrolyte 110 (e.g., positive region of electrolytes 135) with the positive lid portion of the lid 120. At least one insulator layer 160 can separate or electrically isolate the positive lid portion from the negative lid portion. The insulation layer 160 may include dielectric material.

At least one gasket 115 (e.g., sealing element) can be disposed to couple the lid 120 with the first end 170 of the housing 105. The gasket 115 can house, retain, hold, secure, seal, or otherwise include the lid 120. The gasket 115 can include a gasket, a washer, an O-ring, a cap, a fitting, a hose coupling, or any other component to house, retain, hold, secure, or seal the lid 120 with the housing 105.

The gasket 115 can couple with the lid 120 to secure or hold the lid 120 in place and seal the battery cell 100. The seal can be hermetic or sufficient to prevent leakage of the electrolyte 110. For example, the gasket 115 can form the seal across the first end 170 of the housing 105 using the lid 120. The seal formed by the gasket 115 can include any type of mechanical seal, such as a hermetic seal, an induction seal, a hydrostatic seal, a hydrodynamic seal, and a bonded seal, among others. The gasket 115 can include electrically insulating material to electrically isolate portions of the lid 120 (e.g., negative lid portion, positive lid portion) from the housing 105. The gasket 115 can include thermally conductive material to allow heat to evacuate from the inner region 165.

The gasket 115 can couple with the edge or side portion of the lid 120 to secure the lid 120 to the housing 105. The gasket 115 can be positioned on, adjacent or proximate to (e.g., within 1 mm of) or be at least partially supported by an inner surface 145 of the housing 105. For example, the inner surface may be in contact with the gasket 115 or the inner surface may include an indentation that is in contact with the gasket 115 to support the gasket 115 and seal the battery cell 100. The gasket 115 can be held in place by inserting an indentation into the battery cell housing 105 wall at a predetermined distance (e.g., 2.5 mm to 6 mm) below the surface of the crimped edges (or surfaces) 180 around the entire circumference of the housing 105. The crimp edges 180 can create a compressive seal between it and the surface created by the indentation holding the lid 120 and the gasket 115 in place. The battery cell 100 may include multiple gaskets 115 disposed to couple the lid 120 with the first end 170 of the housing 105.

The gaskets 115 can be positioned within the housing 105 such that the lid 120 is disposed over the electrolytes 135. When, for example the battery cell 100 includes two lids 120, e.g., one lid for a positive terminal and one lid for a negative terminal disposed at a same lateral edge of the battery cell 100 (e.g., the top), the battery cell 100 can include two gaskets 115, one for each lid or terminal.

The housing 105 can include one or more crimped edges 180 to house, retain, hold, secure, or seal the gasket 115 to the first end 170 of the housing 105. For example, the first lateral end 170 of the housing 105 can include one or more crimped edges 180 that can be formed such that the respective crimped edges bend over (or are crimped over) the gasket 115 to secure the gasket 115 and seal the battery cell 100. The crimped edges 180 of the first end 170 of the housing 105 can fold, pinch, be bent towards or engage with the gasket 115. The crimped edges 180 can be disposed about at least one side of the gasket 115 to hold the gasket 115 in place, such as but not limited to, hold the gasket 115 in position against a surface (e.g., top surface) of the electrolyte 110 or an insulation layer 160 disposed between the gasket 115 and the electrolyte 110 and seal the battery cell 100. The crimped edges 180 can have a length from its respective outer diameter to its respective inner diameters in a range of about 1 mm to about 3 mm and can span or cover portions of the gasket 115 in a range of 360 degrees. The thickness or length from the outer diameter to the inner diameter of the crimped edges 180 can be formed to be similar or the same as the thickness of the housing 105 (e.g., about 0.15 mm to about 0.35 mm). The seal formed by the gasket 115 can be hermetic or fluid resistant so that the electrolyte 135 does not leak from its location within the housing 105. The lid 120 can be spaced a distance from the electrolyte 110 with the distance corresponding to a thickness of a portion of the gasket 115.

A pressure sensor 125 can be embedded within or otherwise disposed in a portion of the inner surface 145 of the housing 105. The pressure sensor 125 can be positioned proximate to, adjacent to, or in contact with at least one surface of the electrolyte 110 and can measure a pressure within the inner region 165, measure a pressure experienced by the electrolyte 110 or measure a pressure associated with the inner region 165 and the electrolyte 110. The battery cell 100 can include multiple pressure sensors 125 embedded within or otherwise disposed in a portion of the inner surface 145 of the housing 105 such that each of the multiple pressure sensors 125 can be positioned adjacent to, proximate to, or in contact with different portions (e.g., top, bottom, middle) of the electrolyte and along different portions (e.g., top, bottom, middle) of the inner surface 145 of the housing 105. The multiple sensors 125 can measure pressure within different portions of the inner region 165, measure pressure experienced by different portions of the electrolyte 110 or measure pressure associated with different portions of the inner region 165 and the electrolyte 110.

A pressure sensor wire 130 can couple with the pressure sensor 125. The pressure sensor wire 130 can be embedded within or otherwise disposed in a portion of the inner surface 145 of the housing 105 and extend from the pressure sensor 125 to and past an egress point 150 of the first end 170 of the housing 105 such that the pressure sensor wire 125 extends out of the battery cell 100 to provide sensed pressure information from the pressure sensor 125. For example, the pressure sensor wire 130 can pass through or run through a lining of the housing 105.

Multiple pressure sensor wires 130 can be embedded within or otherwise disposed in different portions of the inner surface 145 of the housing 105 and each extend from multiple pressure sensors 125 to and past an egress point 150 of the first end 170 of the housing 105. The pressure sensor wire 130 can include conductive material, metal material or metallic material.

The pressure sensor 125 can be disposed within a recess 135 formed in the inner surface 145 and the pressure sensor wire 130 can be disposed within a groove 140 formed in the inner surface 145. The pressure sensor 125 can have a variety of different shapes, such as but not limited to, rectangular, square, or circular. The pressure sensor 125 can have a variety of different dimensions, such as but not limited to 5 mm×5 mm (e.g., length by width). The shape, dimensions and size of the pressure sensor 125 can be selected based in part on the dimensions of the battery cell 100 and the dimensions of the housing 105. The pressure sensor 125 can include, but not limited to, a flat resistive force sensor.

Figure 2:
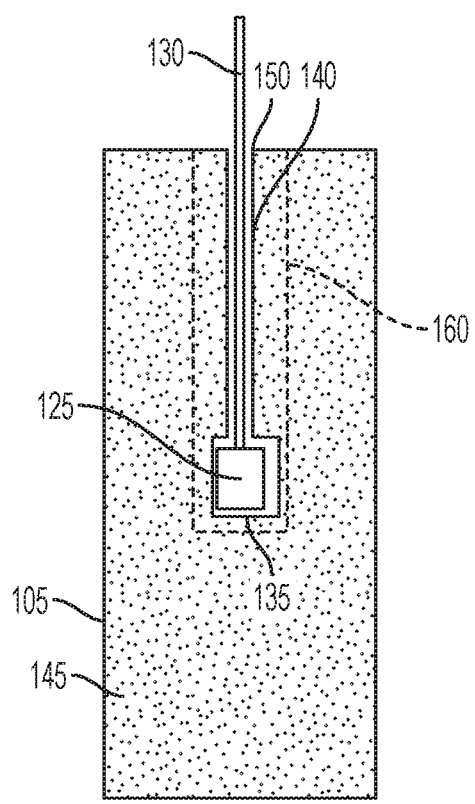
FIG. 2 is a block diagram depicting a cross-sectional view of an example of an inner surface of the battery cell of FIG. 1 having a pressure sensor disposed in a recess and a pressure sensor wire disposed in a groove.

FIG. 2 depicts a cross-sectional view of the inner surface 145 of the housing 105. The inner surface 145 includes at least one recess 135 and at least one groove 140 formed therein. The pressure sensor 125 can be disposed within the recess 135 and the pressure sensor wire 130 can be disposed within the groove 140. The recess 135 can include a slot, indentation, notch, space or depression formed in the inner surface 145 of the housing 105 (e.g., lining of the housing 105). The recess 135 can be formed as a compartment or separate structure within the inner surface 145 such that the recess 135 is shielded or otherwise separated from the inner region 165 of the housing 105 and the electrolyte 110 by one or more layers. The one or more layers may include an insulation layer 160 disposed between the pressure sensor 125 disposed within the recess 135 and the electrolyte 110 or another layer of the inner surface 145 disposed between the pressure sensor 125 disposed within the recess 135 and the electrolyte 110. The insulation layer 160 and the housing 105 can have the same or substantially similar flexural stiffness level. (e.g., common flexural stiffness level). For example, the material of the insulation layer 160 and the material of the housing 150 can bend or resist bending at the same level or degree in response to the same or a similar amount of pressure.

The recess 135 can be formed in a variety of different shapes and dimensions. For example, the recess 135 can be formed having a square shape, a rectangular shape, a spherical shape, or a circular shape. The recess 135 can be formed having a shape and dimensions that correspond to the one or more pressure sensors 125 to be disposed within the respective recess 135. The inner surface 145 may include multiples recesses 135 formed therein, for example, to hold multiple pressure sensors 125. The multiple recesses 135 may each have the same shape and dimensions or one or more of the multiple recesses 135 may have a different shape, different dimensions or a different shape and dimensions.

The groove 140 can include a tunnel, conduit, channel, pathway, slot, indentation, notch, space or depression formed in the inner surface 145 of the housing 105. The groove 140 may be formed as a compartment or separate structure within the inner surface 145 such that the groove 140 is shielded or otherwise separated from the inner region 165 of the housing 105 and the electrolyte 110 by one or more layers. The one or more layers may include an insulation layer 160 disposed between the pressure sensor wire 130 disposed within the groove 140 and the electrolyte 110 or another layer of the inner surface 145 disposed between the pressure sensor wire 130 disposed within the groove 140 and the electrolyte 110.

The groove 140 can be formed in a variety of different shapes and dimensions. For example, the groove 140 can be formed having a square shape, a rectangular shape, or a spherical shape. The groove 140 can be formed having a shape and dimensions that correspond to the one or more pressure sensor wire 130 to be disposed within the respective groove 140. The inner surface 145 may include multiples grooves 140 formed therein, for example, to hold multiple pressure sensor wires 130. The multiple grooves 140 may each have the same shape and dimensions or one or more of the multiple grooves 140 may have a different shape, different dimensions or a different shape and dimensions.

The groove 140 can include an egress point 150 that corresponds to the egress point 150 (e.g., exit orifice) of the housing 105. The groove 140 can guide the pressure sensor wire 140 from the pressure sensor 125, through or along the inner surface 145 of the housing 105 and past the egress point 150. The pressure sensor wire 140 can extend past the egress point 150 such that it extends out of the housing 105 and out of the battery cell 100 to provide a contact point for providing the sensed pressure information obtained by the pressure sensor 125. For example, the egress point 150 may be positioned or located on at least one of the crimped edges 180 of the housing 105 and the groove 140 can guide the pressure sensor wire 140 out of the first end 170 of the housing 105 such that the pressure sensor wire 140 does not contact, the electrolyte 110, the gasket 115 or the lid 120.

The pressure sensor wire 140 can couple with a variety of different instruments or sensors (e.g., sensors external to battery cell 100) within an electrical vehicle that the battery cell 100 is disposed within to provide the sensed pressure information obtained by the pressure sensor 125.

Figure 3:
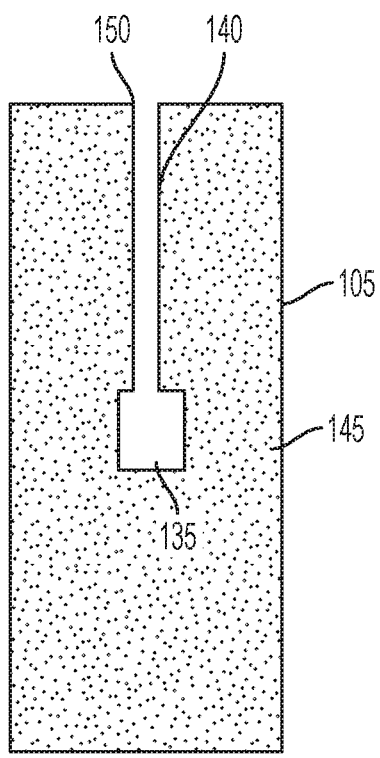
FIG. 3 is a block diagram depicting a cross-sectional view of an example of an inner surface of the battery cell of FIG. 1 having a recess and a groove formed therein.

FIG. 3 depicts a cross-sectional view of the inner surface 145 is provided with the pressure sensor 125 and the pressure sensor wire 140 removed. As depicted in the example of FIG. 3, the groove 140 couples with the recess 135 and provides a pathway from the recess 135 to the egress point 150 (e.g., exit point, exit orifice) of the housing 105. The recess 135 can be formed at a variety of different points, location or regions of the inner surface 145 of the housing 105. The recess 135 can be positioned such that it is formed in a middle portion of the housing 105. For example, the recess 135 can be formed such that it is adjacent to, proximate to, or next to a middle portion of one or more electrolytes 110.

Multiple recesses 135 may be formed in the inner surface 145 of the housing 105. The multiple recesses 135 may be spaced a predetermined distance from each other, such as evenly spaced or unevenly spaced (e.g., spaced at particular locations that do not result in an even spacing along the inner surface 145 from the first end 170 to the second end 175). The spacing of the recesses 135 can be selected based in part on the dimensions of the battery cell 100 and the number of electrolytes 110 in the battery cell 100.

A location or position of the groove 140 can be selected based in part on the location or position of the respective recess 135 the groove 140 is coupled with. The groove can be positioned such that it extends from a middle portion of the inner surface 145 and couples with the recess 135 to the first end 170 and couples with the egress point 150 of the housing 105. In battery cells 100 having multiple recesses 135, multiple grooves 140 may be formed in the inner surface 145 of the housing 105. For example, each of the multiple recesses 135 can couple with at least one of the multiple grooves 140 and each of the multiple grooves can extend to at least one egress point 150 of a plurality of egress points 150 formed in the housing 105.

The groove 140 can be formed having a generally straight shape, curved shape or as the groove 140 extends from the recess 135 to the egress point 150. The groove 140 can have multiple shapes. For example, the groove 140 can include a straight segment, a curved segment, and a second straight segment. The particular shape of the groove 140 can be selected based in part on the shape and dimensions of the inner surface 145 of the housing 150 and the shape and dimensions of the battery cell 100.

Figure 4:
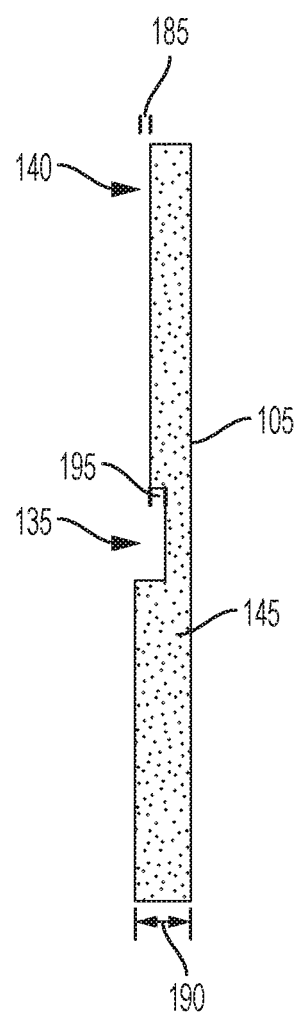
FIG. 4 is a block diagram depicting a side view of an example of an inner surface of the battery cell of FIG. 1 showing a depth of a recess and a groove formed therein.

FIG. 4 depicts a side view of the inner surface 145 of the housing 105 is provided. The housing 105 can have a thickness 190, the recess 135 can have a first depth of 195 and the groove 140 can have a second depth of 185. The first depth 195 and the second depth 185 can be less than the thickness 190 of the housing 105. The first depth 195 of the recess 135 and the second depth 185 of the groove 140 can have a variety of different dimensions. For example, the first depth 195 of the recess 135 can be greater than, the same as or less than the second depth 185. The second depth 185 of the groove 140 can be greater than, the same as or less than the first depth 195. The dimensions (e.g., depth, width, height, etc.) of the recess 135 can be formed to support or match the dimensions of the pressure sensor 125 disposed therein. The dimensions (e.g., depth, width, height, etc.) of the groove 140 can be formed to support or match the dimensions of the pressure sensor wire 130 disposed therein.

FIG. 5 depicts a cross-section view 500 of a battery pack 505 to hold a plurality of battery cells 100 in an electric vehicle. The battery cells 100 can include at least one pressure sensor 125 coupled with at least one pressure sensor wire 130 that extends out the egress 150 of the housing 105 of one or more of the battery cells 100 to provide pressure data.

The battery pack 505 can include a battery case 510 and a capping element 515. The battery case 510 can be separated from the capping element 515. The battery case 510 can include or define a plurality of holders 520. Each holder 520 can include a hollowing or a hollow portion defined by the battery case 510. Each holder 520 can house, contain, store, or hold a battery cell 100. The battery case 510 can include at least one electrically or thermally conductive material, or combinations thereof. The battery case 510 can include one or more thermoelectric heat pumps. Each thermoelectric heat pump can be thermally coupled directly or indirectly to a battery cell 100 housed in the holder 520. Each thermoelectric heat pump can regulate temperature or heat radiating from the battery cell 100 housed in the holder 520. The first bonding element 565 and the second bonding element 570 can extend from the battery cell 100 through the respective holder 520 of the battery case 510.

Between the battery case 510 and the capping element 515, the battery pack 505 can include a first busbar 525, a second busbar 530, and an electrically insulating layer 535. The first busbar 525 and the second busbar 530 can each include an electrically conductive material to provide electrical power to other electrical components in the electric vehicle. The first busbar 525 (sometimes referred to as a first current collector) can be connected or otherwise electrically coupled to the first bonding element 565 extending from each battery cell 100 housed in the plurality of holders 520 via a bonding element 545. The bonding element 545 can be bonded, welded, connected, attached, or otherwise electrically coupled to the second bonding element 565 extending from the battery cell 100. The first bonding element 565 can define the first polarity terminal for the battery cell 100. The first busbar 525 can define the first polarity terminal for the battery pack 505. The second busbar 530 (sometimes referred to as a second current collector) can be connected or otherwise electrically coupled to the second bonding element 570 extending from each battery cell 100 housed in the plurality of holders 520 via a bonding element 540. The bonding element 540 can be bonded, welded, connected, attached, or otherwise electrically coupled to the second bonding element 570 extending from the battery cell 100. The second bonding element 570 can define the second polarity terminal for the battery cell 100. The second busbar 530 can define the second polarity terminal for the battery pack 505.

The first busbar 525 and the second busbar 530 can be separated from each other by the electrically insulating layer 535. The electrically insulating layer 535 can include spacing to pass or fit the first bonding element 565 connected to the first busbar 525 and the second bonding element 570 connected to the second busbar 530. The electrically insulating layer 535 can partially or fully span the volume defined by the battery case 510 and the capping element 515. A top plane of the electrically insulating layer 535 can be in contact or be flush with a bottom plane of the capping element 515. A bottom plane of the electrically insulating layer 535 can be in contact or be flush with a top plane of the battery case 510. The electrically insulating layer 535 can include any electrically insulating material or dielectric material, such as air, nitrogen, sulfur hexafluoride ($SF_6$), porcelain, glass, and plastic (e.g., polysiloxane), among others to separate the first busbar 525 from the second busbar 530.

Figure 6:
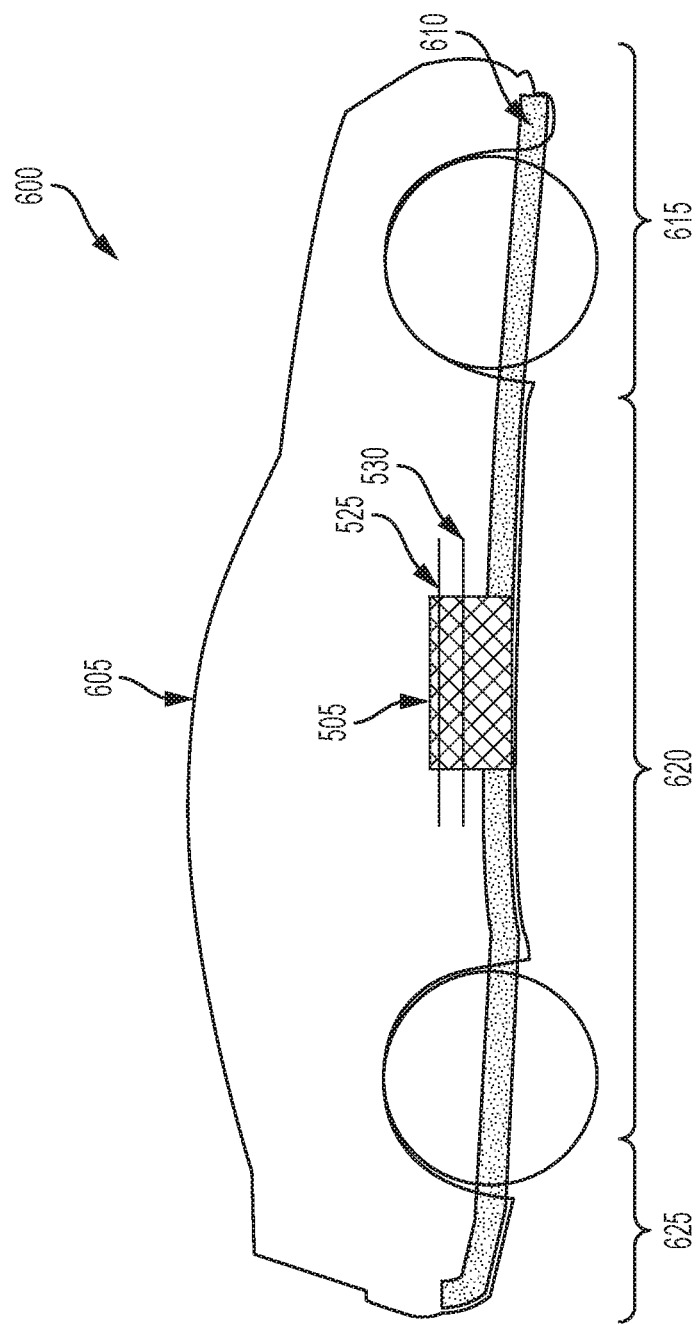
FIG. 6 is a block diagram depicting a cross-sectional view of an example electric vehicle installed with a battery pack.

FIG. 6 depicts a cross-section view 600 of an electric vehicle 605 installed with a battery pack 505. The electric vehicle 605 can include a chassis 610 (sometimes referred to herein as a frame, internal frame, or support structure). The chassis 610 can support various components of the electric vehicle 605. The chassis 610 can span a front portion 615 (sometimes referred to herein a hood or bonnet portion), a body portion 620, and a rear portion 625 (sometimes referred to herein as a trunk portion) of the electric vehicle 605. The front portion 615 can include the portion of the electric vehicle 605 from the front bumper to the front wheel well of the electric vehicle 605. The body portion 620 can include the portion of the electric vehicle 605 from the front wheel well to the back wheel well of the electric vehicle 605. The rear portion 625 can include the portion of the electric vehicle 605 from the back wheel well to the back bumper of the electric vehicle 605.

The battery pack 505 can be installed or placed within the electric vehicle 605. The battery pack 505 can be installed on the chassis 610 of the electric vehicle 605 within the front portion 615, the body portion 620 (as depicted in FIG. 6), or the rear portion 625. The first busbar 525 and the second busbar 530 can be connected or otherwise be electrically coupled to other electrical components of the electric vehicle 605 to provide electrical power.

Figure 7:
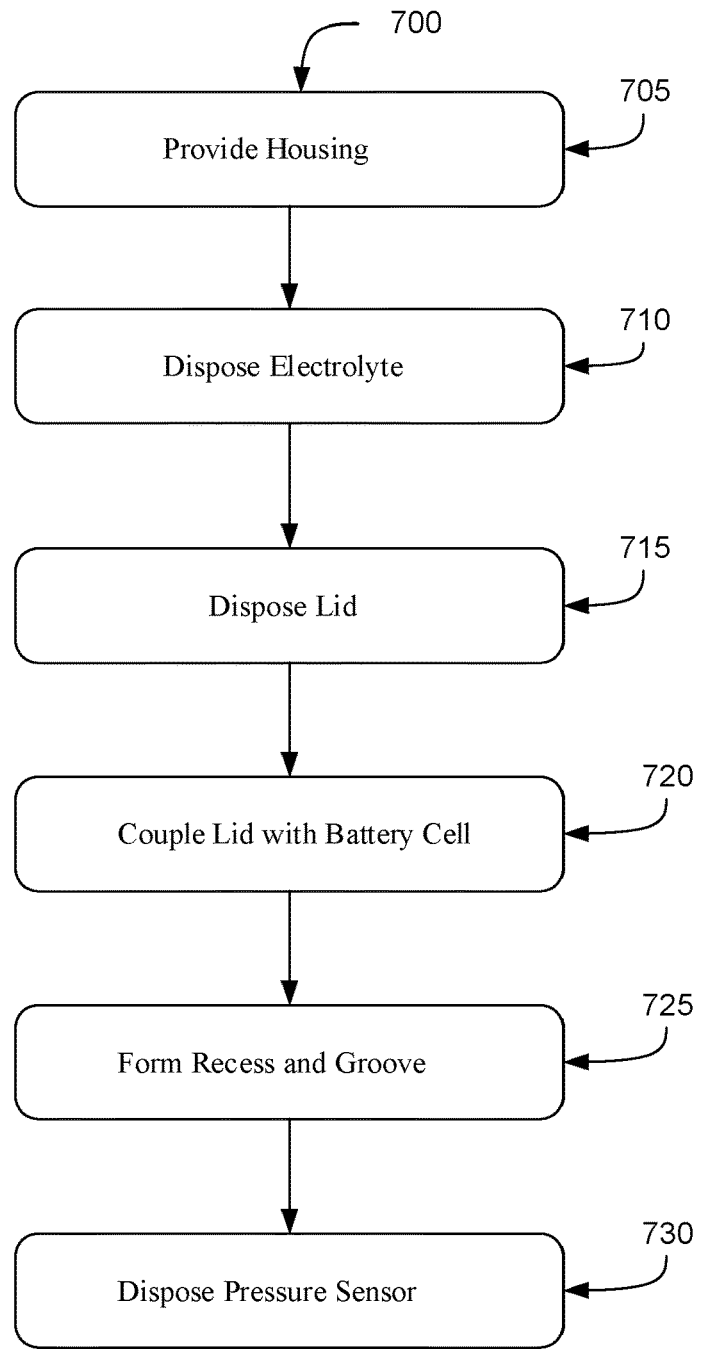
FIG. 7 is a flow diagram depicting a first example method of providing battery cells for battery packs for electric vehicles.

FIG. 7 depicts a method 700 for providing a battery cells for battery packs of electric vehicles. The functionalities of the method 700 can be implemented or performed using any of the systems, apparatuses, or battery cells detailed above in conjunction with FIGS. 1-6. The method 700 includes providing at least one housing (ACT 705). The housing can have a first end, a second end, and an inner surface, the housing defining an inner region, the inner region disposed between the first and second ends. The method 700 can include disposing at least one electrolyte (ACT 710). The electrolyte can be disposed in the inner region of the housing. The method 700 can include disposing at least one lid (ACT 715). The lid can be disposed proximate to the first end of the housing. The method 700 can include coupling the lid with the battery cell (ACT 720). The lid can couple with the first end of the housing to seal the battery cell using a gasket. The method 700 can include forming at least one recess and at least one groove (ACT 725). The recess and the groove can be formed on the inner surface, the groove forming a path from the recess to an egress point on the first end of the housing. The method 700 can include disposing at least one pressure sensor (ACT 730). The pressure sensor can be disposed in the recess formed in the inner surface, the pressure sensor coupled with a pressure sensor wire disposed in the groove, the pressure sensor wire extending from the recess and past the egress point on the first end of the housing to provide sensed pressure information.

The method 700 can provide at least one housing 105 (ACT 705). The housing 105 can include a housing of a battery cell 100. The battery cell 100 can include a lithium ion battery cell, a nickel-cadmium battery cell, or a nickel-metal hydride battery cell, for example. The battery cell 100 can be part of a battery pack 505 installed within a chassis 610 of an electric vehicle 605. The housing 105 can be formed from a cylindrical casing with a circular, ovular, or elliptical base or from a prismatic casing with a polygonal base. The housing 105 can include a first end 170, a second end 175, and an inner surface 145. The housing 105 can define an inner region 165 that is disposed between the first end 170 and the second end 175.

The method 700 can include disposing one or more electrolytes 110 (ACT 710). The one or more electrolytes 110 can be disposed in the inner region 165 of the housing 105. The electrolyte 110 can be provided within the inner region 165 such that it is disposed between the first end 170 and the second end 175 of the housing 105. The battery cell 100 can include multiple electrolytes 110 with the multiple electrolytes 110 disposed proximate to or adjacent to each other and disposed between the first end 170 and the second end 175 of the housing 105.

The electrolytes 110 can couple with the inner surface 145 of the housing 105 through one or more tabs. For example, a tab (e.g., negative tab, positive tab) can couple the electrolyte with the first end 170 of the inner surface 145, the second end 175 (e.g., bottom) of the inner surface 145 or any portion of the inner surface 145 between the first end 170 and the second end 175.

The method 700 can include disposing a lid 120 (ACT 715). The lid 720 can be disposed proximate to the first end 170 of the housing 105. For example, the electrolyte 110 can be disposed within the inner region, and the lid 120 can be disposed proximate to, adjacent to or coupled with the first end 170 of the housing 105. The lid 120 can be positioned such that a first surface (e.g., top surface) of the lid 120 is positioned distal from the electrolyte and forms an exposed surface (e.g., top surface) of the battery cell 100 and a second surface (e.g., bottom surface) of the lid 120 can be positioned proximate to, adjacent to or facing the electrolyte 110 within the inner region 165. For example, the lid 120 can be positioned over the electrolyte 110.

The lid 120 can include or operate as a current interrupter device. For example, the lid 120 can include a positive lid portion and a negative lid portion. The negative lid portion can operate as the negative terminal of the battery cell 100 and the positive lid portion can operate as the positive terminal of the battery cell 100. For example, via a module tab connection (or other techniques such as wire bonding), the positive lid portion and the negative lid portion of the lid can couple the battery cell 100 with current collectors of the battery module from the lateral ends (e.g., top or bottom) or from longitudinal sides of the battery cell 100. The negative lid portion can couple with a negative portion of the electrolyte 110 and the positive lid portion can couple with a positive portion of the electrolyte 110. By removing or installing the lid 120, an electrical connection can be broken or established with the electrolyte 110 and the lid 120 can operate as a current interrupter device for the battery cell 100. The lid 120 may include an insulation layer 160 disposed between the positive lid portion and the negative lid portion to electrically isolate the positive lid portion from the negative lid portion.

The method 700 can include coupling the lid 120 with the battery cell 100 (ACT 720). For example, the lid 120 can couple with the first end 170 of the housing 105 to seal the battery cell 100 using a gasket 115. The gasket 115 can include a gasket, a washer, an O-ring, a cap, a fitting, a hose coupling, or any other component to house, retain, hold, secure, or seal the lid 120 with the first end 170 of the housing 105.

The gasket 115 can couple with the lid 120 to secure or hold the lid 120 in place and seal the battery cell 100. The seal can be hermetic or sufficient to prevent leakage of the electrolyte 110. The seal formed by the gasket 115 can include any type of mechanical seal, such as a hermetic seal, an induction seal, a hydrostatic seal, a hydrodynamic seal, and a bonded seal, among others. The gasket 115 can include electrically insulating material to electrically isolate portions of the lid 120 (e.g., negative lid portion, positive lid portion) from the housing 105. The gasket 115 can include thermally conductive material to allow heat to evacuate from the inner region 165.

The gasket 115 can couple with the edge or side portion of the lid 120 to secure the lid 120 to the housing 105. The gasket 115 can be positioned on, adjacent or proximate to (e.g., within 1 mm of) or be at least partially supported by an inner surface 145 of the housing 105. The battery cell 100 can include multiple gaskets 115 disposed to couple the lid 120 with the first end 170 of the housing 105.

The first end 170 of the housing 105 can be crimped, bent or otherwise manipulated to form one or more crimped edges 180. The crimped edges 180 can house, retain, hold, secure, or seal the gasket 115 to the first end 170 of the housing 105. For example, the crimped edges 180 can be formed such that the respective crimped edges bend over (or are crimped over) the gasket 115 to secure the gasket 115 and seal the battery cell 100.

The crimped edges 180 can be formed using a crimping die having a substantially flat surface. The flat surface of the crimping die can be applied to the first end 170 of the housing 105 to crimp the first end 170 such that it folds, pinches, or engages with the gasket 115. The crimped edges 180 can be disposed about at least one side of the gasket 115 to hold the gasket 115 in place, such as but not limited to, hold the gasket 115 in position against a surface (e.g., top surface) of the electrolyte 110 or an insulation layer 160 disposed between the gasket 115 and the electrolyte 110 and seal the battery cell 100. The seal can be hermetic or fluid resistant so that the electrolyte 135 does not leak from its location within the housing 105.

The method 700 can include forming a recess 135 and a groove 140 (ACT 725). The recess 135 and the groove 140 can be formed on the inner surface 145 of the housing 105. The groove 140 can form a path from the recess 135 to an egress point 150 on the first end 170 of the housing 105.

The recess 135 can be created by forming a slot, indentation, notch, space or depression in the inner surface 145 of the housing 105. The groove 140 can be created by forming a tunnel, conduit, channel, pathway, slot, indentation, notch, space or depression in the inner surface 145 of the housing 105. The recess 135 and groove 140 can be formed using various manufacturing techniques, such as but not limited to additive manufacturing techniques. The recess 135 and groove 140 can be formed as a compartment or separate structure within the inner surface 145 such that the recess 135 or groove 140 is shielded or otherwise separated from the inner region 165 of the housing 105 and the electrolyte 110 by one or more layers. The one or more layers may include an insulation layer 160 or another layer of the inner surface 145. The recess 135 and groove 140 can formed in a variety of different shapes and dimensions. For example, the recess 135 can be formed having a shape and dimensions that correspond to the one or more pressure sensors 125 to be disposed within the respective recess 135. The groove can be formed having a shape and dimensions that correspond to the one or more pressure sensor wire 130 to be disposed within the respective groove 140.

The recess 135 can have a first depth 195 with respect to a thickness 190 of the inner surface 145 of the housing 105 and the groove 140 can have a second depth 185 with respect to the thickness 190 of the housing 105. The first depth 195 of the recess 135 can be the same as, greater than or less than the second depth 185 of the groove 140. The degree or amount of the first depth 195 and the second depth 185 can be based in part on the overall thickness 190 of the housing 105.

The method 700 can include disposing a pressure sensor 125 (ACT 730). The pressure sensor 125 can be disposed in the recess 135 formed in the inner surface 145 of the housing 105. The pressure sensor 125 can couple with a pressure sensor wire 130 disposed in the groove 140. The pressure sensor wire 130 can extend from the recess 135 and past the egress point 150 on the first end 270 of the housing 105 to provide sensed pressure information. For example, the pressure sensor wire 130 can couple with a pressure reading instrument or device disposed within a battery pack 505 of an electric vehicle 605, a pressure reading instrument or device disposed external to the battery pack 505 but within the electric vehicle 605, or a pressure reading instrument or device disposed external to the electric vehicle 605 to provide sensed pressure information from a respective battery cell 100 of the electric vehicle.

Figure 8:
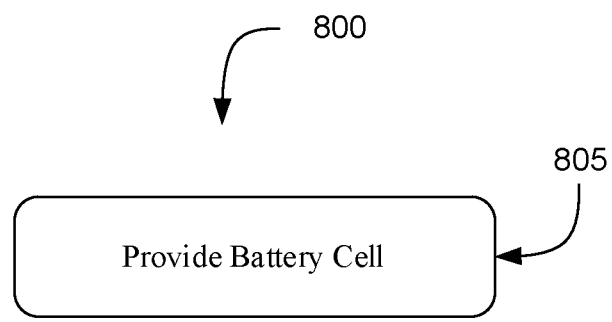
FIG. 8 is a flow diagram depicting a second example method of providing battery cells for battery packs for electric vehicles.

FIG. 8 depicts a method 800 of providing a battery cells for battery packs of electric vehicles. The functionalities of the method 800 can be implemented or performed using any of the systems, apparatuses, or battery cells detailed above in conjunction with FIGS. 1-7.

Method 800 can include providing at least one battery cell 100. (ACT 805). For example, a battery cell 100 of a battery pack 505 to power an electric vehicle 605 can be provided. The battery cell 100 can includes at least one housing 105 having a first end 170, a second end 175, and an inner surface 145. The housing can define an inner region 165 that is disposed between the first end 170 and the second end 175. An electrolyte 110 can be disposed in the inner region 165 of the housing 105. A lid 120 can be disposed proximate to the first end 170 of the housing 105.

A gasket 115 can couple the lid 120 with the first end 170 of the housing 105 to seal the battery cell 100. The inner surface 145 having a recess 135 and a groove 140 formed therein. The groove 140 can form a path from the recess 135 to an egress point 150 on the first end 170 of the housing 105. A pressure sensor 125 can be disposed in the recess 135 formed in the inner surface 145. The pressure sensor 125 can couple with a pressure sensor wire 130 disposed in the groove 140. The pressure sensor wire 130 can extend from the recess 135 and past the egress point 150 on the first end 170 of the housing 105 to provide sensed pressure information.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell of a battery pack to power an electric vehicle, comprising:
    a housing having a first end, a second end, and an inner surface, the housing defining an inner region, the inner region disposed between the first and second ends;
    an electrolyte disposed in the inner region of the housing;
    a lid;
    a gasket that couples the lid with the first end of the housing to seal the battery cell;
    the inner surface having a recess and a groove formed therein, the groove forming a path from the recess to an egress point on the first end of the housing;
    a pressure sensor disposed in the recess formed in the inner surface of the housing, the pressure sensor coupled with a pressure sensor wire disposed in the groove, the pressure sensor wire extending from the recess and past the egress point on the first end of the housing to provide sensed pressure information; and
    an insulation layer disposed between the pressure sensor and the electrolyte.

2. The battery cell of claim 1, comprising:
    the pressure sensor disposed in a middle portion of the inner region of the housing and disposed proximate to a center portion of the electrolyte.

3. The battery cell of claim 1, comprising:
    the recess and the groove having indentations formed in the inner surface of the housing, the recess having a first predetermined depth that is less than a thickness of the housing and the groove having a second predetermined depth that is less than a thickness of the housing.

4. The battery cell of claim 1, comprising:
the recess having a first predetermined depth that is less than a thickness of the housing and the groove having a second predetermined depth that is less than a thickness of the housing, the first predetermined depth is equal to the second predetermined depth.

5. The battery cell of claim 1, comprising:
the recess having a first predetermined depth that is less than a thickness of the housing and the groove having a second predetermined depth that is less than a thickness of the housing, the first predetermined depth is different than the second predetermined depth.

6. The battery cell of claim 1, comprising:
the recess and the groove formed as separate compartments within the interior surface of the housing and separated from the electrolyte by an insulation layer.

7. The battery cell of claim 1, comprising:
the insulation layer disposed between the recess, the groove and the electrolyte, the insulation layer and the housing having a common flexural stiffness level.

8. The battery cell of claim 1, comprising:
the pressure sensor disposed within the inner region such that the insulation layer is in contact with the electrolyte.

9. The battery cell of claim 1, comprising:
a plurality of pressure sensors disposed within at least one recess of the plurality of recesses formed in the inner surface of the housing;
each of the pressure sensors coupled with at least one of a plurality of pressure sensor wires disposed within at least one groove of a plurality of grooves formed in the inner surface of the housing; and
each of the plurality of pressure sensors disposed proximate to different portions of the electrolyte.

10. The battery cell of claim 1, comprising:
a plurality of electrolytes disposed within the inner region of the housing; and
the pressure sensor disposed proximate to a first electrolyte of the plurality of electrolytes.

11. The battery cell of claim 1, comprising:
the first end of the housing having a crimped edge that is disposed over the gasket.

12. The battery cell of claim 1, comprising:
the battery cell disposed in a battery module having multiple battery cells, the battery cell being the only cell in the battery module to include the pressure sensor.

13. The battery cell of claim 1, comprising:
the battery cell disposed in a battery module having multiple battery cells, one or more of the multiple battery cells having pressure sensors.

14. The battery cell of claim 1, comprising:
the battery cell disposed in a battery module having multiple battery cells, each of the multiple battery cells include pressure sensors.

15. The battery cell of claim 1, comprising:
the battery cell disposed in a battery module and the battery module disposed in an electric vehicle.

16. A method of providing battery cells for battery packs of electric vehicles, comprising:
providing a housing having a first end, a second end, and an inner surface, the housing defining an inner region, the inner region disposed between the first and second ends;
disposing an electrolyte in the inner region of the housing
disposing a lid proximate to the first end of the housing;
coupling the lid with the first end of the housing to seal the battery cell using a gasket;
forming a recess and a groove on the inner surface, the groove forming a path from the recess to an egress point on the first end of the housing;
disposing a pressure sensor in the recess formed in the inner surface of the housing, the pressure sensor coupled with a pressure sensor wire disposed in the groove, the pressure sensor wire extending from the recess and past the egress point on the first end of the housing to provide sensed pressure information; and
disposing an insulation layer between the pressure sensor and the electrolyte.

17. The method of claim 16, comprising:
providing the insulation layer between the recess and the electrolyte and between the groove and the electrolyte, the insulation layer and the housing having a common flexural stiffness level.

18. The method of claim 16, comprising:
providing the battery cell in a battery module having multiple battery cells, one or more of the multiple battery cells having pressure sensors.

19. The method of claim 16, comprising:
providing the battery cell in a battery module; and
providing the battery module in an electric vehicle.

20. A method, comprising:
providing a battery cell of a battery pack to power an electric vehicle, the battery cell comprising:
a housing having a first end, a second end, and an inner surface, the housing defining an inner region, the inner region disposed between the first and second ends;
an electrolyte disposed in the inner region of the housing
a lid disposed proximate to the first end of the housing;
a gasket that couples the lid with the first end of the housing to seal the battery cell;
the inner surface having a recess and a groove formed therein, the groove forming a path from the recess to an egress point on the first end of the housing;
a pressure sensor disposed in the recess formed in the inner surface of the housing, the pressure sensor coupled with a pressure sensor wire disposed in the groove, the pressure sensor wire extending from the recess and past the egress point on the first end of the housing to provide sensed pressure information; and
an insulation layer disposed between the pressure sensor and the electrolyte.

* * * * *